Dec. 24, 1940.   W. M. GLEZEN   2,225,986
SHOCK ABSORBER
Filed Nov. 16, 1938    2 Sheets-Sheet 1
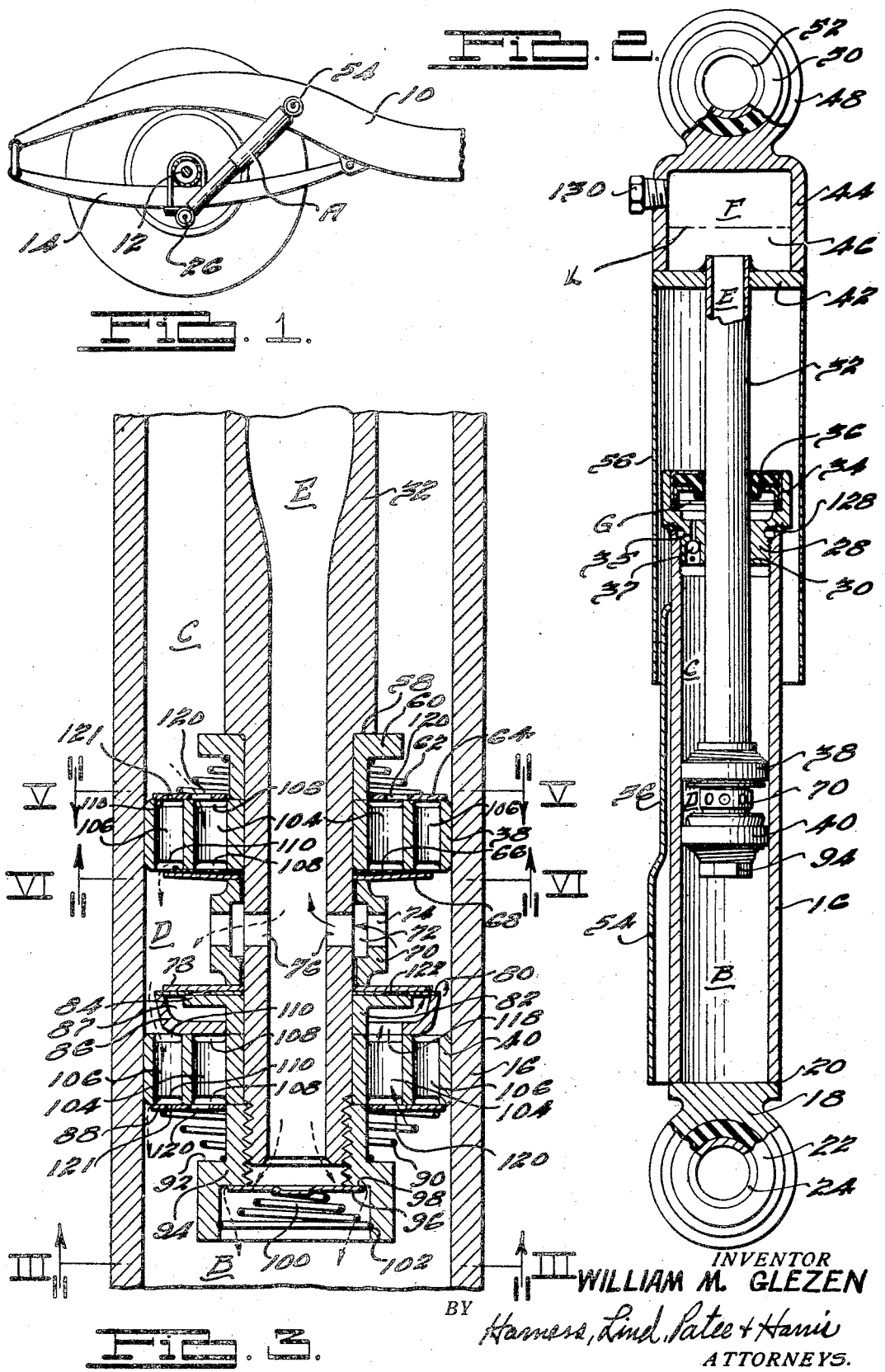
INVENTOR
WILLIAM M. GLEZEN
BY Harness, Dind, Patee & Harris
ATTORNEYS.

Dec. 24, 1940.   W. M. GLEZEN   2,225,986
SHOCK ABSORBER
Filed Nov. 16, 1938    2 Sheets-Sheet 2
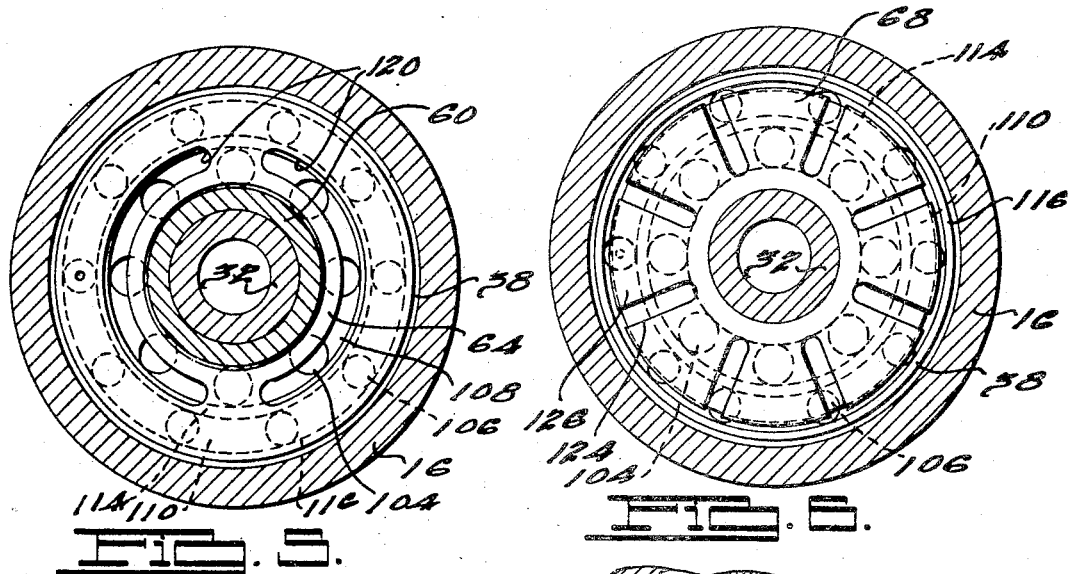
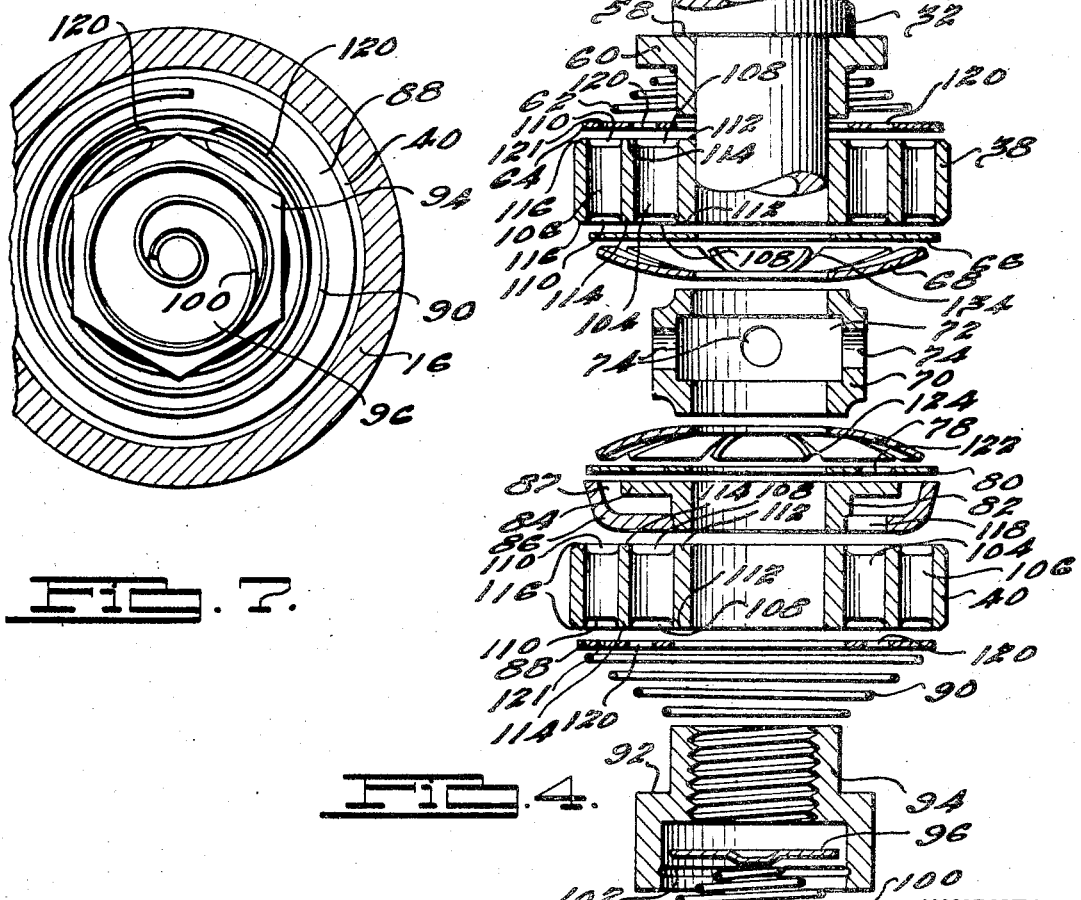
INVENTOR
WILLIAM M. GLEZEN
BY Harness, Dickey, Pierce & Harris
ATTORNEYS.

Patented Dec. 24, 1940

2,225,986

UNITED STATES PATENT OFFICE 2,225,986

SHOCK ABSORBER

William M. Glezen, Highland Park, Mich., assignor to Chrysler Corporation, Highland Park, Mich., a corporation of Delaware Application November 16, 1938, Serial No. 240,606

11 Claims. (Cl. 188—88)

This invention relates to a shock absorber and more particularly to a hydraulic shock absorber of the direct acting type.

The present invention is primarily directed to hydraulic shock absorbers having one or more ported pistons working in a pressure cylinder. Valve means are associated with the pistons for regulating the passage of hydraulic fluid through the pistons in both directions of movement of the piston in the fluid pressure chamber.

An important feature of the invention resides in the provision of a hollow piston rod through which fluid may be conducted to and from a reservoir.

Another object of the invention is the provision of a novel arrangement of valves for regulating the flow of fluid from one end of the shock absorber to the other and into the hollow piston rod.

A further object of the invention is to provide protective shields for the cylinder casing whereby this wall tubular members may be used for the cylinder.

Other objects and advantages of the invention will be more fully understood from the following description taken in connection with the accompanying drawings in which:

Fig. 1 is a diagrammatic view of a portion of an automobile showing an application of the shock absorber.

Fig. 2 is a longitudinal sectional view of the shock absorber.

Fig. 3 is an enlarged longitudinal sectional view of a portion of the shock absorber showing the pistons and valve mechanism.

Fig. 4 is an exploded sectional view of the pistons and valve mechanism showing how the parts are assembled on the piston rod.

Fig. 5 is a sectional view taken on line V—V of Fig. 3.

Fig. 6 is a sectional view taken on line VI—VI of Fig. 3; and

Fig. 7 is a sectional view taken on line VII—VII of Fig. 3.

Referring to the drawings, particularly to Fig. 1, an automobile frame 10 is shown supported on an axle 12 through springs 14 and the shock absorber is shown at A having its opposite ends connected respectively to the frame 10 and axle 12.

The shock absorber comprises a cylindrical tube 16 having its lower end closed by a fitting 18 which is welded to the end of the tube 16 as at 20. The lower end of the fitting is formed ringlike to receive a cylindrical rubber member 22 into which is inserted a metallic sleeve 24 which receives an attaching member such as a bolt 26, shown in Fig. 1.

The inner periphery of the upper end of the tube 16 is screw threaded to receive a threaded fitting 28, having a central opening 30, which has a sliding fit with a tubular connecting rod 32 passing therethrough. The outer end of the fitting 28 is bored out as at 34 to receive a suitable packing 36 which makes a fluid tight seal with the rod 32 passing through the opening 30. A small opening 35 is provided in the end of the fitting 28 and a one-way ball check valve 37 regulates the flow of fluid therethrough, more fully explained in the description of the operation of the shock absorber.

The tubular connecting rod 32 is provided with pistons 38 and 40 on the end projecting in the tube 16 and the opposite end of the rod 32 is provided with a ring 42 which is welded thereto and to which is welded an inverted cup shaped member 44 which provides a chamber 46 communicating with the hollow rod 32. The outer end of the cup shaped member 44 is provided with an integral ring-like member 48 which receives a cylindrical rubber member 50 into which is inserted a metallic sleeve 52 fitting an attaching member such as a bolt 54, shown in Fig. 1.

A cylindrical shell 56 is secured to the under surface of the ring 42 and telescopes the cylindrical tube 16, moving longitudinally relative thereto with the connecting rod 32. This shell 56 serves as a guard for the rod 32 and tube 16. Another guard 54 is secured to the tube 16 which, in the form shown, is positioned on one side thereof. It has a reduced dimension as at 56 to fit within the shell 52.

Referring to the pistons and valves and particularly to Figs. 3 to 7, inclusive, the pistons 38 and 40 are spaced on the inner end of the rod 32 and have a sliding fit within the cylinder 16. The rod 32 is provided with a diameter of reduced dimension to provide a shoulder 58 against which a flanged sleeve 60 abuts forming a stop for the piston 38 and the flange forming an abutment for a helical compression spring 62 which forces a disk valve 64 against the upper surface of the piston 38.

A disk valve 66 is provided at the lower surface of the piston 38 held in position against the lower surface of the piston 38 by a finger spring 68. The valve 66 and spring 68 are held in position by a collar 70 having opposite end portions in sliding fit with the rod 32 and its intermediate portion spaced therefrom to provide an annular groove 72 which communicates with radially extending openings 74 in the collar 70 and aligned openings 76 in the wall of the rod 32 forming a passage from the piston chamber to the interior of the hollow connecting rod 32.

A finger spring 78 engages the lower end of the collar 70 and it engages a disk valve 80 which is positioned on a collar 82 having a radially extending flange 84. A saucer shaped member 86 is carried by the collar 82 and has its outer periphery spaced from the outer periphery of the flange 84 and in contacting relation to the outer periphery of the valve 80. The member 86 and flange 84 are spaced apart axially and radially to provide a passage 87. The purpose of this construction is to conduct the fluid against the outer portion of the valve 80 and spring 78 to permit its operation at a less pressure than would be required if the fluid was operating at a point radially inwardly. This will be more fully understood in the portion of this specification relating to the operation of the device.

The piston 40 is placed on the rod 32 with its upper surface in contact with the saucer shaped member 86 and a disk valve 88 is placed on the rod 32 in contact with the lower surface of the piston 40. A helical compression spring 90 is held between the valve 88 and a shoulder 92 on a member 94 which is screw-threaded on the lower end of the rod 32, the upper surface of the member 94 engaging the piston 40, holding all of the parts in proper assembled relation on the rod 32. The member 94 is hollow being screw-threaded at one end and bored out on the other to form a valve chamber at the lower end of the hollow rod 32. A disk valve 96 rests against a shoulder 98 formed by the bored out portion and is held in position by a helical compression spring 100, the lower end of which is positioned in an annular groove 102 on the inner periphery of bored out portion of the member 94.

The pistons 38 and 40 are each provided with two sets of radially spaced openings 104 and 106, each set extending circumferentially around the piston. The inner openings 104 are larger than the openings 106 but fewer in number so that the total area of one set is substantially equal to the area of the other set. Radially spaced grooves 108 and 110 are provided in the upper and lower faces of the pistons 38 and 40. The grooves 108 are in circumferential registration with the openings 104 and the grooves 110 are in circumferential registration with the openings 106 thus providing communication between the openings 104 of one set and communication between the openings 106 of the other set as well as forming annular inner, intermediate and outer ribs 112, 114 and 116, respectively, upon which the valves 64, 66 and 88 seat. The saucer shaped member 86 seats on the upper ribs 112 and 114 of the piston 40 and is provided with openings 118 in registration with the openings 104.

The valves 64 and 88 are substantially identical and have a diameter large enough to cover the grooves 108 and 110 in the end faces of the pistons 38 and 40. Each valve is provided with semi-circular openings 102 over the grooves 10. If desired a small vent opening 121 may be provided over the grooves 110 to permit a slight flow of fluid through the openings 106.

The valve 66 has a diameter which will cover the lower groove 108 in the piston 38 and partially cover the lower groove 110 in the piston 38. This valve 66 is imperforate acting as a one-way valve for the openings 104 and as a restriction valve for the openings 106.

The valve 80 has a diameter large enough to cover the outer edge of the saucer shaped member 86 normally covering the passage 87. A plurality of openings 122 are provided in the valve 80 which are normally closed when the valve is down on the flange 84 but opened when the valve is sprung away against the spring 78.

The finger springs 68 and 78 are formed concave with radially extending slots 124. These slots have substantially parallel side walls forming resilient finger 126 larger at the outer periphery than at any other point. By this formation the area of contact between the outer periphery of the finger 126 and the valves 66 and 80 is maximum and the valves 66 and 80 are uniformly held on their seats.

For the purpose of more clearly describing the operation of the shock absorber, the several chambers have been designated by the letters B to G, inclusive. The chamber B will be referred to as the compression chamber, C the rebound chamber, D the intermediate chamber, E the connecting rod chamber, F the reserve chamber and G the fluid trap chamber.

The shock absorber is filled with a fluid such as oil while the relatively movable parts are in contracted relation, that is, the pistons are at the bottom of the compression chamber B. The fitting 34 has been previously screw-threaded into the upper end of the tube 16 but not tightly sealed on the gasket 128. This permits a leak so that the air in the chambers is expelled when the fluid is forced in.

A plug 130 in the reserve chamber F is removed and a fitting, not shown, connected to a fluid supply under pressure is inserted in place of the plug. The fluid then enters the reserve chamber F, connecting rod chamber E, through valve 96 and openings 76 and 74 into the chambers B and D forcing the air in the chambers through the loosely fitted fitting 34. The fluid in the chamber D is conducted through the openings 106 in the piston 38 to the chamber C. The chambers are filled to a level indicated by the line L. An air space is left in the reserve chamber F to permit expansion of the liquid. When the chambers are filled with fluid, the fitting 34 is tightened to sealing position and the plug 130 is inserted.

Fig. 2 shows the parts in substantially their normal position. During the compression stroke the pistons 38 and 40 move downwardly to decrease the volume of chamber B, subjecting the fluid therein to pressure and causing the excess fluid to pass through the openings 120 in the valve 88, openings 104 in the piston 40, openings 118 and passage 87. The fluid pressure causes the outer edge of the valve 80 to open. A portion of the fluid flows around the edge of the valve 80 and another portion flows through the openings 122 in valve 80 as indicated by the arrows in full lines in Fig. 3.

It will be here noted that the arrows shown in full lines on the right hand side of Fig. 3 indicate the flow of fluid during the compression stroke and that the arrows shown in dotted lines on the left hand side of Fig. 3 indicate the flow of fluid during the rebound stroke.

The fluid flow in the intermediate chamber D is divided, a portion going through the openings 74 and 76 to the connecting rod chamber E and another portion going through the openings 106 in the piston 38, causing the outer edge of the valve 64 to open permitting a flow of fluid through the openings 120 in the valve 64 and around the edge of the valve into the rebound chamber C.

The openings 74 and 76 have a combined area such that there will be a resistance to the flow of fluid and a greater restriction than the flow of fluid through the piston 38. This is to assure a supply of fluid to the chamber C and prevent all of the fluid from flowing into the chambers E and F. The flow of fluid through the openings 74 and 76 is equal in amount to the displacement area of the rod 32 as it enters the chamber C. The air in the reserve chamber F, above the normal fluid level, is compressed and reduced in area to the extent of the area of the amount of rod 32 displacement.

During the rebound stroke the fluid in the chamber C flows through the openings 120 in the valve 64 and through openings 104 in the piston 38, causing the outer edge of the valve 66 to open to permit the fluid to enter the chamber D. A portion of the fluid in chamber E flows to the chamber D through the openings 74 and 76 but a larger portion is delivered to the chamber B through the one-way valve 96. Because the openings 74 and 76 have been restricted, the return flow of fluid is not sufficient and places too great a resistance in the action of the rebound stroke. For this reason the valve 96 has been provided to operate on the rebound stroke only.

The fluid in the chamber D flows around the saucer shaped member 86, through openings 106 in the piston 40, causing the valve 88 to open, and around the valve 88 to the chamber B.

Any fluid which might leak from the chamber C through between the rod 32 and member 28 is collected in the chamber G. On the compression stroke the valve 37 is opened and the fluid is returned to the chamber C. On the rebound stroke the fluid pressure in the chamber C closes the valve.

Various changes including the size, shape and arrangement of parts may be made without departing from the spirit of my invention and it is not my intention to limit its scope other than by the terms of the appended claims.

I claim:

1. In a hydraulic shock absorber of the direct acting type, a cylinder, closed at one end, a hollow open end piston rod mounted for reciprocation in said cylinder and in sealing relation with the opposite end of said cylinder, axially spaced pistons on said rod within said cylinder, having radially spaced openings therethrough, valve members at each of the opposite sides of each of said pistons for controlling the flow of fluid through the openings in said pistons, and a valve at the open end of said hollow piston rod for bypassing a portion of the fluid around said valves in one of said pistons.

2. In a hydraulic shock absorber of the direct acting type, a cylinder closed at one end thereof, a hollow open end piston rod mounted for reciprocation in said cylinder and in sealing relation with the opposite end of said cylinder, said hollow rod having an opening in its side wall spaced from the open end thereof between the opposite ends of said cylinder, a pair of axially spaced pistons on said rod at the opposite sides of the opening in the side wall of said hollow piston rod, said pistons having passages therethrough to conduct fluid from one side of the piston to the other, valves for controlling the flow of fluid through the passages, and a valve at the open end of said piston rod.

3. In a hydraulic shock absorber of the direct acting type, a cylinder closed at its opposite ends, a hollow piston rod extending through one end of said cylinder and in sealing relation therewith, a fluid reservoir carried by said rod, a pair of spaced pistons having openings therethrough carried by said rod and in said cylinder, valves for controlling the flow of fluid through the openings in said pistons, said rod forming a communication from said reservoir to the interior of said cylinder between an end of said cylinder and said piston adjacent said end, and a passage in said piston rod at a point between said pistons forming a communication from the cylinder to said reservoir.

4. In a hydraulic shock absorber of the direct acting type, a cylinder closed at its opposite ends, a reciprocating member in said cylinder for creating a fluid pressure alternately at each of the opposite ends only of said cylinder when said reciprocating member is moved in opposite directions, valve means and openings in a portion of said reciprocating member for conducting a fluid through said reciprocating member from one side of said reciprocating member to the other side thereof and into said reciprocating member respectively and valve means and openings in another portion of said reciprocating member for conducting a fluid through said reciprocating member from said last mentioned side of said reciprocating member to said first mentioned side of said reciprocating member respectively.

5. In a hydraulic shock absorber of the direct acting type, a cylinder closed at its opposite ends, a hollow piston rod reciprocable through one end of said cylinder and in sealing relation therewith, a pair of spaced pistons adjacent the end of said rod within said cylinder having openings therethrough through which fluid in said cylinder may pass from the outer side of one piston to the outer side of the other piston, valve means on said pistons for controlling the openings in said pistons so constructed and arranged that when said pistons are moved in one direction fluid on the outer side of one of said pistons is conducted through that piston, one portion of the fluid flowing through that piston being conducted through the other piston and the other portion of such fluid being conducted into said hollow piston rod and when said pistons are moved in the opposite direction said valve means causes a flow of fluid on the pressure side of the other of said pistons through both of said pistons, and valve means for controlling the flow of fluid from the interior of said hollow piston rod to the outer side of said first mentioned piston.

6. In a hydraulic shock absorber of the direct acting type, a cylinder closed at its opposite ends, a hollow open end piston rod extending through one end of said cylinder and in sealing relation therewith, a valve at the open end of said piston rod, a piston on said rod adjacent the open end thereof, valves at the opposite sides of said piston for controlling passages therethrough, a second piston spaced axially from said first named piston on said piston rod, valves at the opposite sides of said second piston for controlling passages therethrough, and a restricted passage through the wall of said hollow piston rod between said pistons forming a conduit from the space between said pistons to the interior of said hollow piston rod.

7. In a hydraulic shock absorber of the direct acting type, a cylinder closed at its opposite ends, a hollow piston rod reciprocable through one end of said cylinder and in sealing relation therewith, a pair of spaced pistons adjacent the end of said rod within said cylinder having openings therethrough through which fluid may pass from the pressure end of said cylinder to the opposite end thereof, valve means on said pistons for controlling the openings in said pistons, said rod having an opening in its side wall between said pistons to conduct the amount of fluid equal to the rod displacement from said cylinder to the interior of said hollow rod, and a one-way valve in the end of said hollow rod to permit flow of fluid from the interior of said hollow rod to the end of said cylinder beyond the inner end of said rod.

8. In a hydraulic shock absorber, a cylinder, a hollow piston rod reciprocable in said cylinder having its inner end open and of outer reduced diameter, a piston slidable over the outer reduced diameter portion of the rod on the outer periphery thereof, a hollow screw-threaded fitting on the inner end of said rod for retaining said piston rigidly on said rod, and a valve assembly for the open end of said rod carried solely by said fitting.

9. In a hydraulic shock absorber, a cylinder, closed at its opposite ends, a hollow piston rod reciprocable through one end of said cylinder and in sealing relation therewith, a piston adjacent the end of said rod within said cylinder, valves associated with said piston to regulate the flow of fluid through said piston from one end of said cylinder to the other, a valve in the open end of said rod within said cylinder between said piston and the end of said cylinder remote from the end through which said rod extends, and a closed reservoir communicating with the opposite open end of said rod external of said cylinder.

10. In a hydraulic shock absorber, a cylinder, a hollow piston rod reciprocable through one end of said cylinder, a pair of axially spaced pistons on the end of said rod within said cylinder having openings therethrough, valve means for the openings for controlling the flow of fluid through the openings whereby fluid in said cylinder may pass from the outer side of one piston to the outer side of the other piston, said hollow piston rod having openings communicating with the interior of said hollow rod and the space between said pistons, said openings being restricted to a greater extent than the openings through said pistons.

11. In a hydraulic shock absorber, a cylinder, a hollow piston rod reciprocable through one end of said cylinder, a pair of axially spaced pistons on the end of said rod within said cylinder having openings therethrough through which fluid in said cylinder may pass from the outer side of one piston to the outer side of the other piston, valve means on said pistons for controlling the flow of fluid through the openings, said hollow piston rod having openings communicating with the interior of said hollow rod and the space between said pistons, said openings being restricted to a greater extent than the openings through said pistons, and a one way valve in the end of said hollow rod arranged to conduct a flow of fluid from the interior of said rod to said cylinder below said pistons only.

WILLIAM M. GLEZEN.